Oct. 2, 1962  H. KOESLING  3,056,878
DEVICE FOR CONVEYING STEPWISE WORK PIECES THROUGH
AN INDUCTIVE HEATING FURNACE
Filed Feb. 15, 1960  2 Sheets-Sheet 1
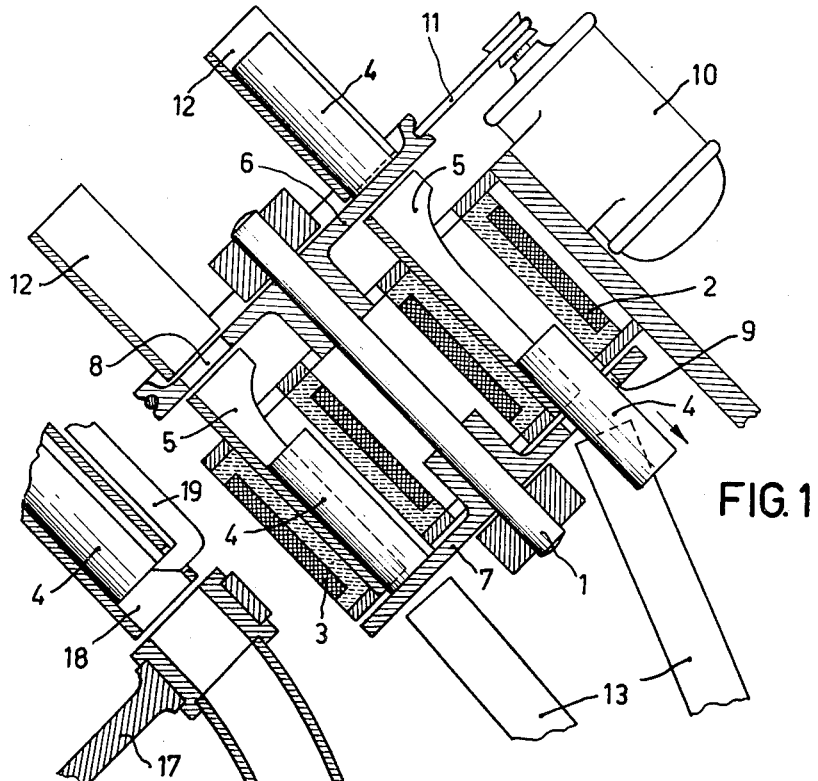
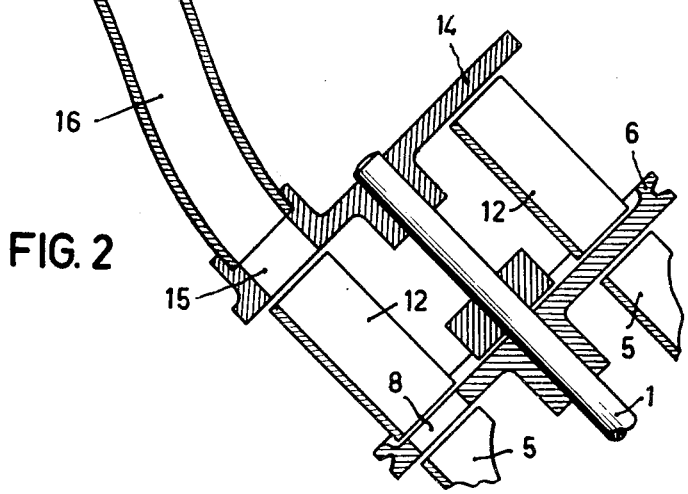
INVENTOR
HEINZ KOESLING Oct. 2, 1962 H. KOESLING 3,056,878
DEVICE FOR CONVEYING STEPWISE WORK PIECES THROUGH
AN INDUCTIVE HEATING FURNACE
Filed Feb. 15, 1960 2 Sheets-Sheet 2

INVENTOR
HEINZ KOESLING

United States Patent Office 3,056,878
Patented Oct. 2, 1962

3,056,878
DEVICE FOR CONVEYING STEPWISE WORK PIECES THROUGH AN INDUCTIVE HEATING FURNACE
Heinz Koesling, Reichenbach (Fils), Germany, assignor to North American Philips Company, Inc., New York, N.Y., a corporation of Delaware
Filed Feb. 15, 1960, Ser. No. 8,866
Claims priority, application Germany Mar. 19, 1959
3 Claims. (Cl. 219—10.71)

The invention relates to a device for transporting stepwise work pieces through an inductive heating furnace comprising slanting sliding tracks serving for supporting and conveying the work pieces and control-members to move the work pieces on the sliding tracks.

It is known for this purpose to provide a slanting sliding track with a control-member having a braking member to hold the work piece in the heating device, with a feeding member for supplying a new work piece and with a positioning member to move a further work piece into a suitable position. These members are coupled to each other so that they are actuated at the required rate or in the correct order of succession. The control-member is formed, in this case, by a mechanical rod system, which may, for example, be actuated in due time by means of a cam disc.

This known device has, however, the disadvantage that the operation of such control-members, operating as a rocker lever, is not very reliable, while these members are noisy and are subjected to a fairly considerable wear. If a heating device is to be used for attaining forging heat, the power of a single inductor will, in general, not be sufficient, this inductor then comprising such a conveying sluice device, that a plurality of such arrangements are to be used, side by side, these arrangements having a correspondingly different rate of operation. Thus, the system becomes complicated and is liable to be disturbed.

These disadvantages are obviated in a device according to the invention, which is characterized in that a plurality of inductors each capable of accommodating one work piece with sliding tracks in the interior are arranged stationary around a slanting, rotatable shaft in a circle with their axes parallel to each other. Two control-dics are seated on this shaft, of which discs one covers the supply end and the other the outlet end of the inductors and each disc has at least one opening to allow the work pieces to pass, the openings of one disc being displaced through an angle corresponding to the distance between the inductors relatively to the openings of the other disc. In this arrangement the work pieces are conveyed, consequently, by the control-discs so that the individual inductors, in order of succession, receive fresh work pieces by means of one control-disc, whereas the other control-disc causes each work piece heated to the final temperature to slide out of the inductor concerned. The control-discs are actuated continuously or stepwise; the rate of movement and the current intensity in the inductors are proportioned so that at the release the work pieces have reached the desired final temperature.

According to an advantageous further embodiment of the invention the slanting, rotatable shaft is provided, above the disc controlling the inductor inlet openings at a distance of at least one length of a work piece, with a third control-disc, of which the opening for passing the work pieces is displaced relatively to the aforesaid control-disc also through an angle corresponding to the distance between the inductors. This facilitates a correct supply of new work pieces.

It is efficient in this case to connect the pass opening of the third-control-disc through a guide channel with a work piece feeding member arranged in line with the axis of the control-discs, which member is provided with a blocking rocker for the work piece release. Thus the new work pieces can be supplied in a more or less regular order of succession, to the work piece feeding member, which serves as a store and releases a new work piece according to need.

In the case of a partial heating of the work pieces it is efficient to arrange the disc controlling the outlet openings of the inductors at a corresponding distance from the inductors on the shaft. The distance is chosen so that the work pieces extend in the inductors only over the length for which they are to be heated.

The drawing shows diagrammatically a few embodiments of the invention.

FIG. 1 is a sectional view of a device according to the invention, comprising two control-discs.

FIG. 2 shows an addition to the device shown in FIG. 1, comprising a third control-disc and a work-piece feeding channel

Figure 3:
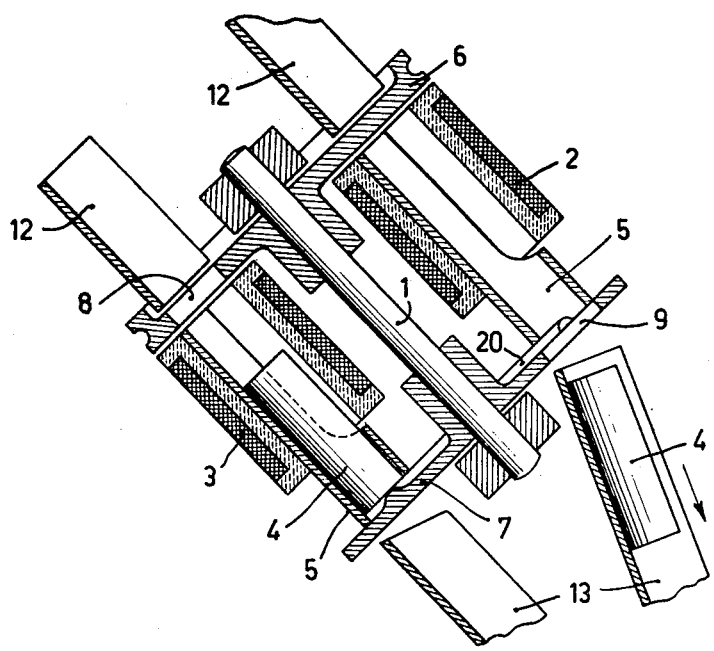
FIG. 3 shows a device as in FIG. 1 for a partial annealing of the work pieces.

In the device shown in FIG. 1 four inductors are arranged in a circle around a shaft 1, inclined through an angle of 45°; for the sake of clarity only two diametrically opposite inductors 2 and 3 are shown. Their axes are parallel to the shaft 1 and in their interior spaces sliding paths 5 are arranged for the transport of the work pieces 4 also at an angle of inclination of 45°.

On the shaft 1 are seated two control-discs 6 and 7, which control the supply and the output of work pieces to and from the inductors. In the embodiment shown the disc 6 controlling the supply is provided with an opening 8, which releases, during the rotation of the shaft 1, the inlet parts of the inductors in order of succession. Also the control-disc 7, which releases the work pieces heated up to the desired temperature, is provided with a similar opening 9. The shaft 1 is driven by an electric motor 10, which is coupled through a rope 11 with the control-disc 6. The latter is provided to this end with a thickened rim, which is provided with a suitable groove. In front of the control-disc 6 are arranged feeding slides 12 for the work pieces, the axes of which gutters are in line with the inductor axes, while similarly behind the control-disc 7 delivery slides 13 are arranged, along which each work piece is transported further after its release to be processed further.

New work pieces are supplied manually to the feeding slides 12. Since in the position of the control-discs shown the opening 8 of the control-disc 6 is located in front of the inductor 3, the work piece provided in the slide 12 concerned slides immediately into the inductor 3, where it occupies the position shown in the drawing. The coil current then performs, in known manner, the heating of the work piece 4. After a given time the control-discs are turned by the motor 10 through 90° so that a fresh work piece is permitted to slide into the next-following inductor. Thus, in order of succession, all inductors are provided with work pieces, while the operator has the duty to see to it that fresh work pieces are constantly placed in the emptied slides 12. When the control-disc arrangement has been turned through the required angle, the outlet opening 9 of the control-disc 7 arrives in front and the outlet terminus of the inductor of the work piece has reached the prescribed final temperature. In order to clarify this it is assumed that this is the inductor 2 shown in FIG. 1. In general the control-disc 7 prevents the work piece from sliding out of the inductors, but in the case of the inductor 2 the control-disc 7 has aligned the outlet so that the work piece 4 arranged in it slides out of the inductor and arrives in the delivery slide 13 where it is moved to its further process. After the first step of the control-disc arrangement the opening 9 of the control-disc 7 arrives in front of the outlet of the next-following inductor, where the process described above is repeated. During operation a work piece 4 heated to its final temperature is released constantly at each step of the control-disc arrangement.

In order to simplify the supply to the device and to render it independent of the operator's attentiveness a supply member as shown in FIG. 2 may be provided in addition. In this case the shaft 1 is provided above the supply-control-disc 6 with a further control-disc 14 at a distance exceeding slightly the length of a work piece. Between the control-discs 6 and 14 are arranged the correspondingly shortened supply slides 12. Also the control-disc 14 is provided with an opening 15 suitable for a work piece to pass through; a guide channel 16 is joined thereto, which channel is curved so that its end remote from the disc 14 is coaxial to the shaft 1. At its free end this guide channel is journalled in a holder 17; in front of the free end provision is made of a work piece supply member 18, which comprises a stock of fresh work pieces 4. According to requirements these work pieces are separately released by a blocking rocker 19 and then slip into the slide channel 16, which supplies them during the stepwise rotation of the control-discs, to the supply slides 12. In contradistinction to the simplified embodiment shown in FIG. 2 the opening 15 in the control-disc 14 may be displaced relatively to the opening 8 in the control-disc 6 through an angle corresponding to the distance between the inductors.

A similar guide channel may otherwise be used also at the outlet instead of the slide 13.

The device shown in FIG. 1 does not permit the work pieces to be heated uniformly throughout their length, since the work-pieces are not entirely symmetrically located in the interior of the inductors. This is evident from the position of the work piece 4 in the inductor 3. If heating is to be limited further to one end of the work piece, the device may be constructed as is shown in FIG. 3. In this case the control-disc 7 is seated on the shaft 1 at such a distance from the outlet ends of the inductors 2 and 3 respectively that the work pieces, as is shown at the inductor 3, penetrate only over part of their length into the inductor. In order to improve the guiding of the work pieces the sliding tracks 5 project below by a corresponding piece. Since the work pieces engage, with their bottom head surface, the control-disc 7, a fairly considerable amount of friction is produced during the stepwise rotation of the control-disc, at the said place. Therefore the control-disc 7 is provided with an annular elevation 20, which provides a substantially linear contact between the control-disc 7 and the head surfaces of the work pieces.

What is claimed is:

1. A turret device for stepwise transport of work pieces through an inductive heating system comprising track means for supplying said work pieces to said device, a plurality of inductors arranged in a circle and each having a supply end and an outlet end and being capable of accommodating an individual work piece in a sequential arrangement, said inductors being angularly inclined relative to said track means, a rotatable shaft for said device being parallel to the axes of said inductors, said shaft being provided with two spaced control discs of which one covers the supply ends while the other covers the outlet ends of said inductors, said control discs having openings therein which when aligned with the supply and outlet ends of said inductors permits the respective work piece to enter or be withdrawn from said device, and a third apertured control disc above the control disc covering said supply end and spaced therefrom at least the length of one work piece for initially receiving each of said work pieces.

2. A turret device for stepwise transport of work pieces through an inductive heating system as claimed in claim 1 wherein said track means for supplying said work pieces to said device includes a guide channel and a work piece supply member co-axial with said guide channel and provided with a blocking means to release said work pieces into said guide channel.

3. A turret device for stepwise transport of work pieces through an inductive heating system as claimed in claim 1 wherein said control disc covering the outlet ends of said inductors is seated on said shaft at such a distance from said inductors that only a partial heating of the work pieces occurs.

References Cited in the file of this patent

UNITED STATES PATENTS

| | | |
|---|---|---|
| 2,604,576 | Collyer | July 22, 1952 |
| 2,647,199 | Wharff, | July 28, 1953 |
| 2,754,396 | Albrecht | July 10, 1956 |
| 2,905,797 | Guyer et al. | Sept. 22, 1959 |